(12) United States Patent   (10) Patent No.: US 8,009,403 B1
Mallary et al.                   (45) Date of Patent: Aug. 30, 2011

(54) DISK PRECONDITIONING APPARATUS AND RELATED METHOD

(75) Inventors: Michael Mallary, Sterling, MA (US); David Peterson, Charlton, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 961 days.

(21) Appl. No.: 11/523,357

(22) Filed: Sep. 19, 2006

Related U.S. Application Data (60) Provisional application No. 60/735,129, filed on Nov. 9, 2005.

(51) Int. Cl.
 *H01F 13/00* (2006.01)
 *H01H 47/00* (2006.01)
(52) U.S. Cl. ........................................ 361/149; 361/267
(58) Field of Classification Search .................. 361/149, 361/143, 267; 360/66
 See application file for complete search history.

(56) References Cited

U.S. PATENT DOCUMENTS

| | | | | |
|---|---|---|---|---|
| 2,634,861 A | * | 4/1953 | Stearns | 209/223.1 |
| 4,360,854 A | * | 11/1982 | Schergen et al. | 361/149 |
| 4,730,230 A | * | 3/1988 | Helfrick | 361/151 |
| 4,838,771 A | * | 6/1989 | Kikuchi | 417/417 |
| 5,635,889 A | | 6/1997 | Stelter | 335/306 |
| 6,249,200 B1 | | 6/2001 | Stelter et al. | 335/302 |
| 6,256,185 B1 | * | 7/2001 | Maller | 361/152 |
| 7,079,345 B1 | | 7/2006 | Nguy et al. | 360/66 |
| 7,092,188 B2 | * | 8/2006 | Price et al. | 360/66 |
| 7,263,199 B2 | * | 8/2007 | Trandafir | 381/409 |
| 2004/0051610 A1 | * | 3/2004 | Sajan | 335/284 |
| 2005/0219732 A1 | * | 10/2005 | Ito | 360/66 |
| 2006/0272937 A1 | * | 12/2006 | McLeod et al. | 204/192.12 |

OTHER PUBLICATIONS

Company Milestones. Seagate. Dec. 2010. <http://www.seagate.com/www/enus/about/corporate_information/company_milestones/>.*

* cited by examiner

*Primary Examiner* — Jared J Fureman
*Assistant Examiner* — Christopher J Clark (57) ABSTRACT

An apparatus and method for preconditioning a magnetic recording disk is provided in which two substantially identical, but opposing, pancake coils are disposed generally parallel to one another with a gap therebetween into which a disk to be preconditioned is inserted. A large pulse of current is delivered to the coils to generate a magnetic field that is sufficiently strong to precondition the disk. The radial fields of each respective pancake coil add together in the gap where the disk is located, and the field presets both the data layer and the hard bias layer of the SUL. Outside of the gap region, the fields cancel one another such that there are essentially no perpendicular fields due to the symmetry of the coils, such that there is very little net residual perpendicular magnetization when the disk is removed from the gap. An electrical circuit for producing the current pulse is provided. An aluminum support structure provides thermal management and magnetic flux conductivity for the system.

18 Claims, 7 Drawing Sheets

DISK PRECONDITIONING APPARATUS AND RELATED METHOD

CROSS REFERENCE TO RELATED APPLICATION

The present application claims priority from U.S. Provisional Patent Application No. 60/735,129, which was filed on Nov. 9, 2005, by Mallary et al., for a DISK PRECONDITIONING APPARTUS, which provisional application is hereby incorporated by reference as though fully set forth herein.

BACKGROUND OF THE INVENTION

1. Field of the Invention

This invention relates generally to magnetic recording disks and, more particularly, to preconditioning such disks prior to use thereof.

2. Background Information

Disks used for magnetic recording and storage of data have a number of layers that perform various functions for correctly writing data on the disk, reading data back from the disk, and locating data in the appropriate track on the disk. The composition of the layers of a disk depends upon whether the disk is used for longitudinal recording or perpendicular magnetic recording, for example. The initial magnetization of the layers must be controlled and this differs depending upon the composition of the layers and the intended use of the disk.

Recently, the trend in magnetic recording is to employ perpendicular magnet recording techniques. In perpendicular magnetic recording, the magnetic domains are aligned perpendicularly to the surface of the disk platter. This allows bits to be placed closer together on the platter, thus increasing storage density over that which has been achieved in conventional longitudinal recording in which the domains are in the plane of the disk.

In a perpendicular magnetic recording disk medium, a first layer is typically a mechanical protective layer comprised primarily of carbon. This layer protects the next layer, which is the magnetic layer where the data is stored. An intermediate layer is often used to aid in obtaining perpendicular orientation of the magnetic moments in the media magnetic layer.

Perpendicular magnetic recording disks also employ a soft magnetic underlayer (also referred to as the "SUL"), which serves as a conduit for the magnetic recording flux. During a write operation, the magnetic flux emanates from a monopole writing element, and is directed through the recording layer and returns through the soft under-layer path and back to the writing element. Thus, it is desirable that the soft magnetic underlayer exhibit low coercivity, high saturation magnetization, and moderate but constant permeability in the range of the write fields.

However, demagnetizing fields of the outer and inner edges of a magnetic disk give rise to the formation of complex closure domain structures known as "domain walls" which can interfere with the storage medium flux and result in a phenomenon as "spike noise." Specifically, domain walls form in a soft underlayer between adjacent regions that are magnetized radially outwardly and radially inwardly. In between the two regions, the magnetization must cross the domain wall, that is, change direction, which causes the magnetic flux to rotate outwardly in a perpendicular orientation and then back down to the plane of the disk. While the flux is pointed generally perpendicular to the disk, the magnetic flux creates a spike, (commonly known as "spike noise"). The spike noise can reach the read head and cause errors. The spike can be approximately 1 micron wide, and can thus affect about 40 bits of data, possibly creating read errors in those 40 bits of data.

In order to address this, many disks employ a hard bias layer adjacent to the soft underlayer material. This hard bias layer is a magnetic material which is coupled to the soft underlayer material to cause a radial biasing of the SUL. The hard bias layer must be initially set so that it properly biases the SUL radially, i.e., in the plane of the disk.

A technique had been proposed for radially magnetizing the hard bias layer of a SUL using a large permanent magnet to precondition the disk. Using this technique, the disk is passed through the permanent magnet such that the disk is subjected to an in plane field. When the process is completed, the disk is removed from the magnet. During removal, the associated edge fields continue to affect the disk as the disk is being removed. These edge fields have perpendicular components that thus interfere with the desired radial pattern of magnetization.

In addition to presetting the hard bias layer of the SUL, the data layer of the disk must be initially set such that it is in the equivalent of an AC demagnetization state. This provides an optimum condition for the data to be written onto the disk successfully and reliably. Perpendicular components are preferably avoided in setting the data layer because such components interfere with proper write and read back operations.

In prior techniques, particularly in longitudinal recording, a DC erase process was used to preset the magnetization of the data layer. However, in perpendicular magnetic recording media, a DC erase process is disadvantageous due to the density of the cells in which the magnetic domains are contained. It is particularly harmful in the servo regions. Thus, a DC erase process is not suitable for preconditioning a disk which is for use in perpendicular magnetic recording.

Furthermore, the data layer cannot be set by a permanent magnet in the same way as the hard bias layer in prior techniques because the field required for data layer setting is larger than that needed to set the hard bias layer. More specifically, the field required to completely wipe clean and preset the data layer is on the order of 9,000 Oersteds (Oe). Such a large field is typically not capable of being produced by a large permanent magnet of a manageable size.

Moreover, a large permanent magnet has a perpendicular field component at the exit that leaves the data layer with some perpendicular DC magnetization, which can cause asymmetry problems during spiral self servo write. In addition, some fields produced by large permanent magnets can be non-uniform, which is also undesirable in this context. In addition, such large permanent magnets are quite expensive and may require massive shielding to protect other equipment in the vicinity.

To reset the data layer, it has been proposed to sweep an in-plane permanent magnet from the inner diameter (ID) to the outer diameter (OD) of a revolving disk on a certifier tool. However, this certifier tool technique tends to leave residual magnetization in the data layer in a spiral pattern that can also interfere with spiral self servo write.

There remains a need, therefore, for an apparatus and method for placing the data layer of a disk quickly into the equivalent of an AC demagnetization state, and which apparatus and method can also be used to preset the hard bias layer of the SUL to produce an essentially domain wall free SUL, with a hard bias layer that has magnetization in a radial direction, which is suitable for perpendicular magnetic recording media.

SUMMARY OF THE INVENTION

The disadvantages of prior techniques are overcome by the apparatus and techniques of the present invention in which two substantially identical, but opposing, pancake coils are disposed generally parallel to one another with a gap therebetween into which a disk to be preset is inserted. A large pulse of current is delivered to the coils to generate a large magnetic field. More specifically, the radial fields of each respective pancake coil add together in the space in the gap where the disk is located. Outside of the gap region, the fields radiating from each respective pancake coil cancel one another. There are essentially no perpendicular fields due to the symmetry of the coils such that there is very little net residual perpendicular magnetization. The field symmetry is enhanced by connecting the coils in parallel so that any geometric asymmetry is compensated by the division of drive current between the coils in a way that minimizes any perpendicular excess field, and thus, the field imposed on the disk. This balance is also effective to minimize mechanical forces on the disk due to the repulsive force between the currents resulting from the current pulse.

Further in accordance with the invention, an electrical circuit is provided to generate the current pulse. One embodiment of the circuit includes an SCR circuit which provides a current pulse of about 400 amps per coil to yield a field of about 10 kilooersted (kOe) at the surface of the disk. Basically, the circuit discharges a capacitor so a current pulse flows into the inductor coil and a series resistor to generate the current pulse. The large current pulse produces a correspondingly large repulsive mechanical force on the disk, but as the coils are balanced, these forces are also balanced. An optional free wheeling diode can be used in the circuit to control stray current flow, thus allowing a higher current pulse without damaging the SCR or other equipment in the area.

A suitable aluminum base structure provides support for each coil. The aluminum base structure includes apertures which provide air flow paths to dissipate heat and allow for the flow of magnetic flux. In addition, the aluminum base itself acts as a heat sink for the coils. Further, the aluminum base It also minimizes current losses and provides a rigid mechanical support against the impulse forces produced during the current pulse, which forces can be on the order of 800 pounds.

In accordance with another aspect of the invention, a pair of coils can be used to generate a high magnetic field for other applications. In one embodiment, only one coil can be used if it is properly supported to absorb the impulse force as discussed.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
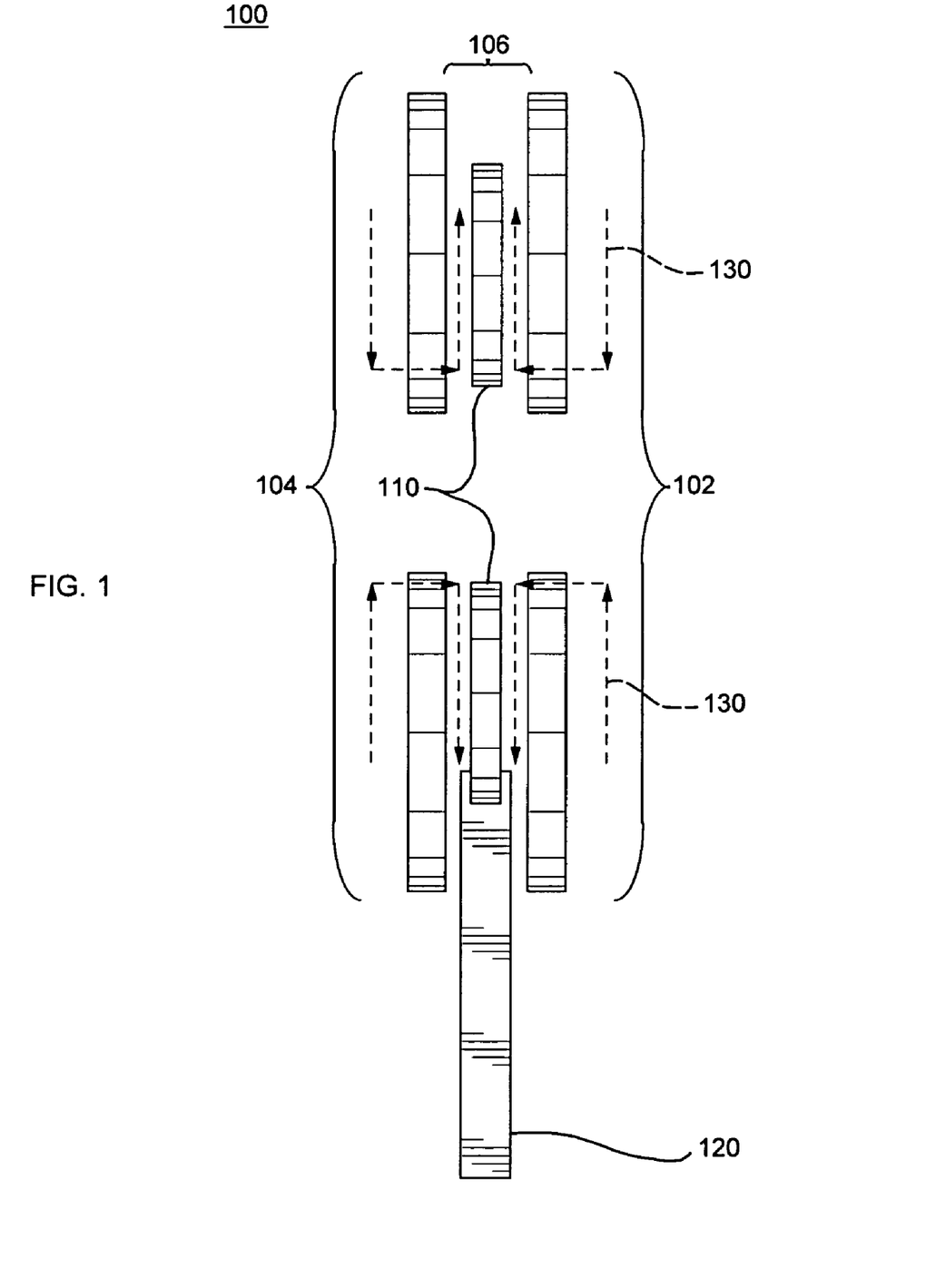
FIG. 1 is a simplified block diagram of one embodiment of the pair of pancake coils and the disk disposed therebetween that may be advantageously used in the present invention.

FIG. 1 is a schematic illustration of a portion the disk preconditioning system 100 of the present invention. The system 100 includes two pancake coils 102 and 104, which are substantially identical in size, but opposed in winding orientation, and which are disposed generally parallel to one another with a gap 106 being defined therebetween. A disk 110 is fixed to a suitable robot arm 120 which moves the disk 110 into the gap 106 between the coils for preconditioning.

Illustratively, the pancake coils 102 and 104 may have an outer diameter of approximately 4.3 inches or such other dimension as required so that the diameter of the coils exceeds the outer diameter of the disk 110 by at least three times the size of the gap 106. The gap is about 0.25 inches wide in accordance with an illustrative embodiment of the invention. This results in a field of about 85% of the field strength at the inner portion of the disk.

When a high current pulse is driven to the coils using a circuit described in further detail herein, a magnetic field, which is illustrated by the dashed lines 130 in FIG. 1, is directed radially in the plane of the disk 110.

Figure 2:
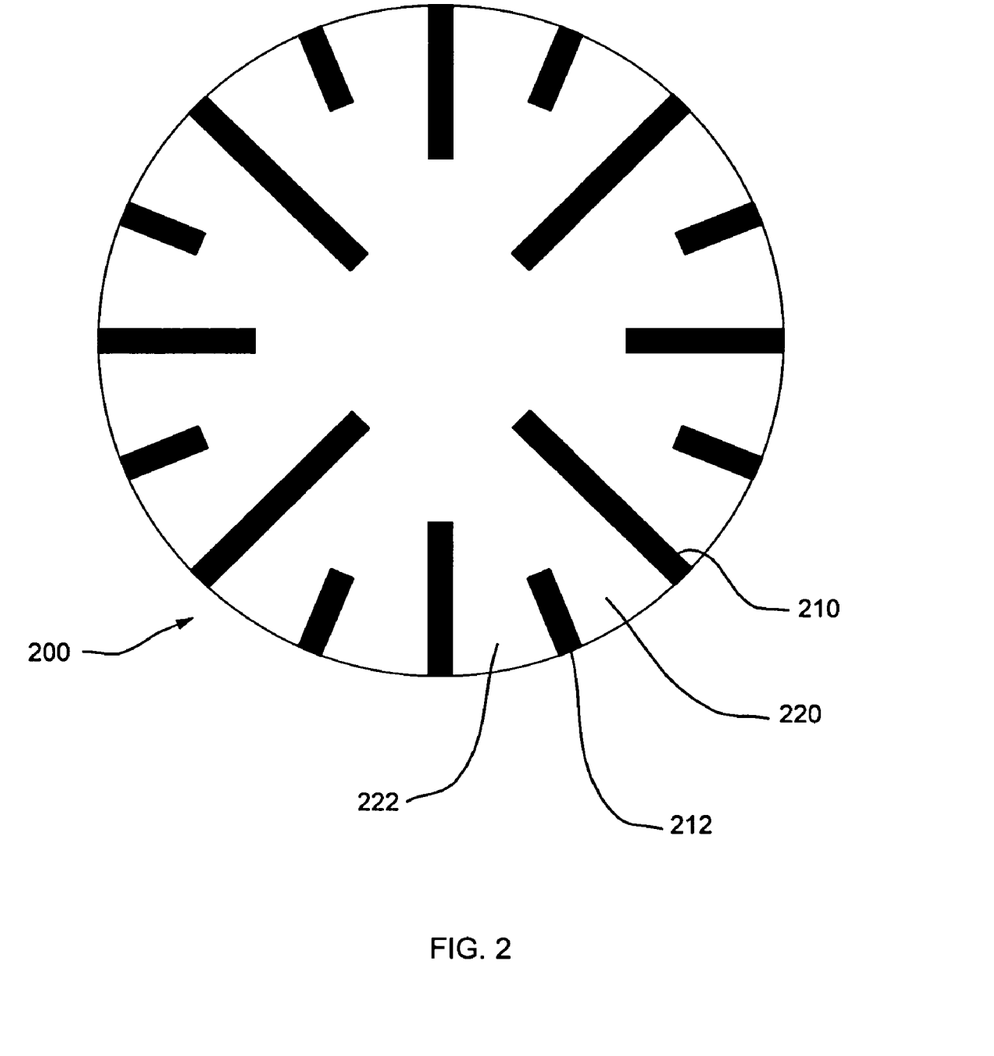
FIG. 2 is a schematic illustration of the spoke pattern of the aluminum support structure in accordance with an illustrative embodiment of the present invention.
Figure 3:
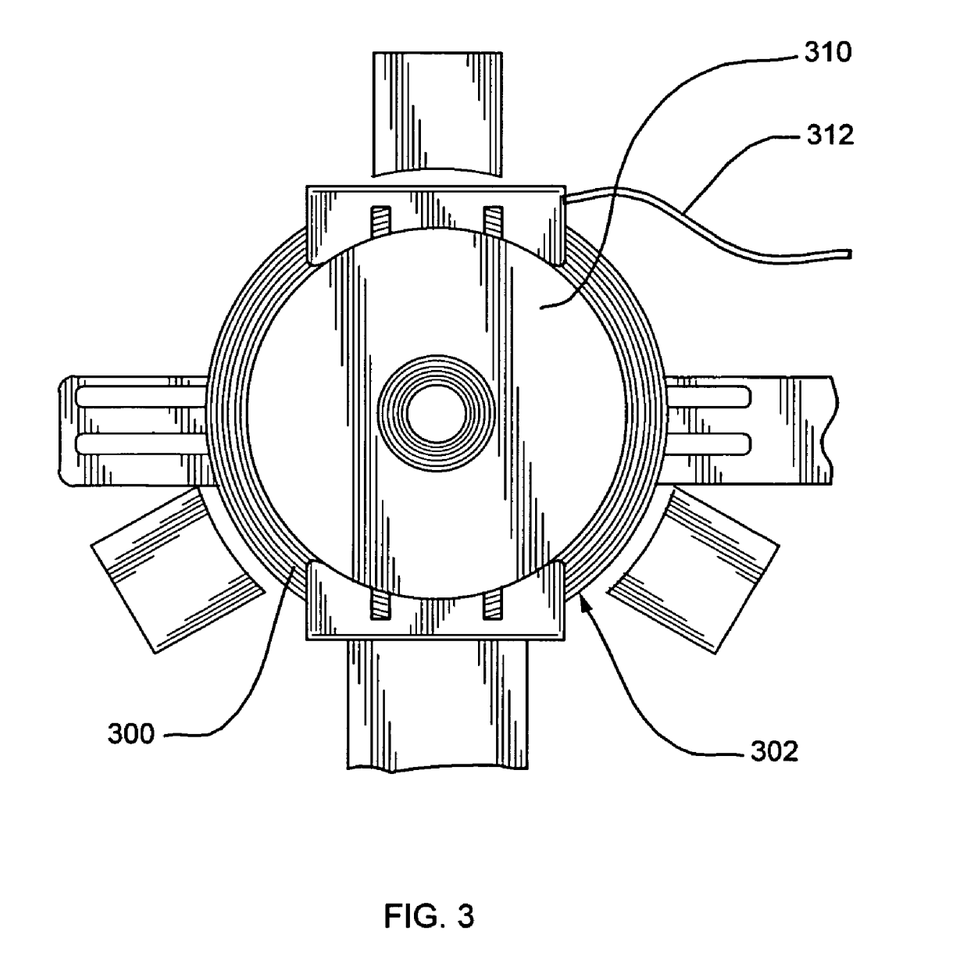
FIG. 3 is a schematic block diagram of a single pancake coil and an aluminum mount with a disk in the pulsing position in accordance with an illustrative embodiment of the present invention.

In accordance with the invention, the pair of coils 102,104 is bound to a robust aluminum base (FIG. 3). FIG. 2 is a schematic illustration of one component 200 of the aluminum base structure for supporting one of the coils. The aluminum component 200 contains a plurality of spokes 210, 212 with apertures, such as the apertures 220, 222, between spokes. The spokes 210, 212 provide rigid mechanical support against the repulsive forces that occur when the current pulse is driven to the coils. The apertures 220,222 provide paths for the magnetic flux generated by the coil to penetrate through to the disk. In addition, the apertures and spokes provide thermal conductivity for the support and air flow paths to further dissipate heat and to heat sink the coil. A fan (not shown) may also be included, if desired. The support structure also minimizes eddy current losses.

For purposes of clarity of illustration, a single pancake coil 300, which is mounted on an aluminum support structure component 302, is illustrated in FIG. 3. The disk 310 is held in position when a current pulse is driven by the lead wire 312 which is coupled to the coil 300. In accordance with the invention, a corresponding coil held on an aluminum support structure would be located parallel to the coil 300 to perform the pre-conditioning process.

Figure 4:
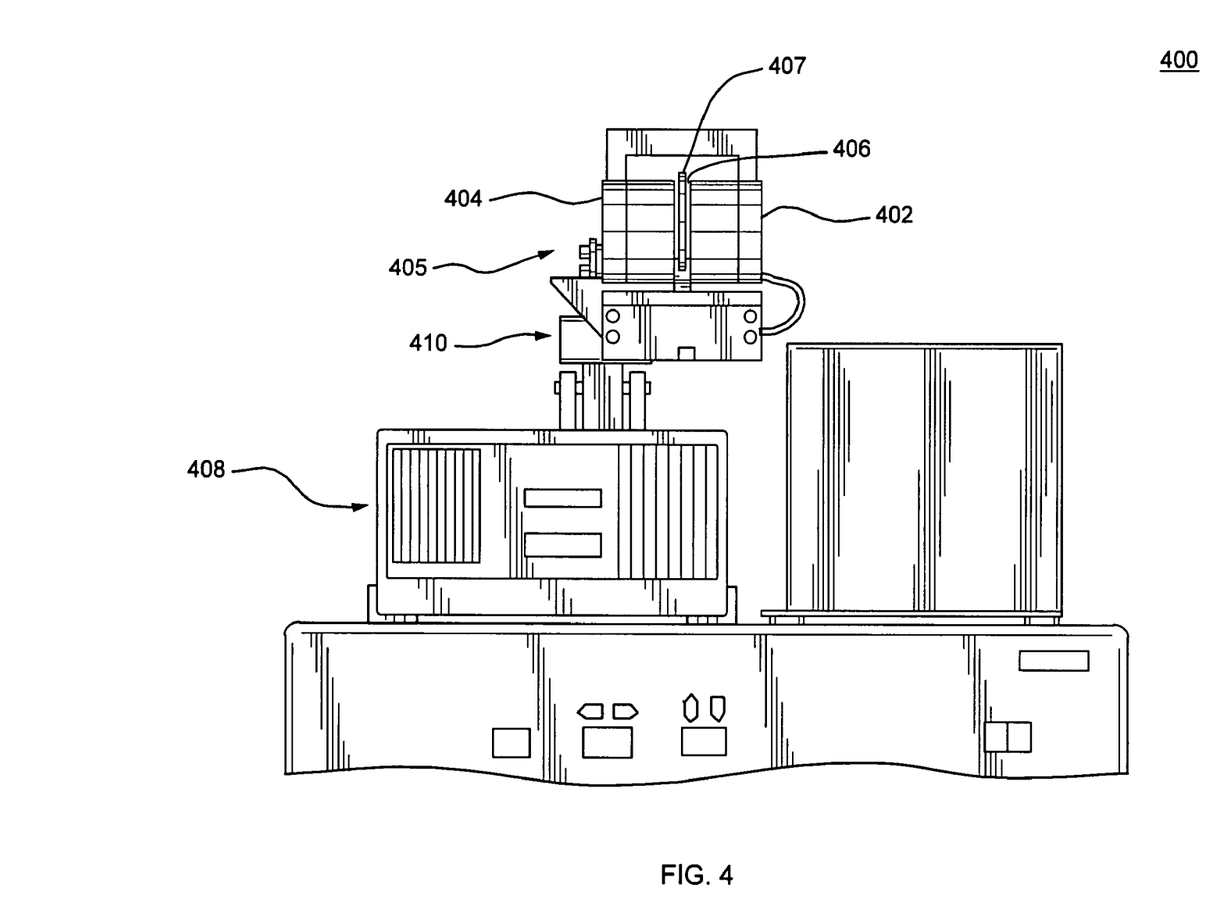
FIG. 4 is an illustrative embodiment of a disk preconditioner with the robotic disk removable arm and the pancake coil pair in accordance with an illustrative embodiment of the present invention.

The entire assembly is illustrated in FIG. 4. The system 400 includes a pair of substantially identical parallel pancake coils 402, 404 as described herein with a gap 406 therebetween mounted on an aluminum base structure 405. The system 400 includes a plurality of disks housed in a protective plastic cassette case 408. A robot arm assembly 410 is configured to retrieve a disk from the cassette 408 and place the disk 407 into the gap 406 between two coils for preconditioning.

Figure 5:
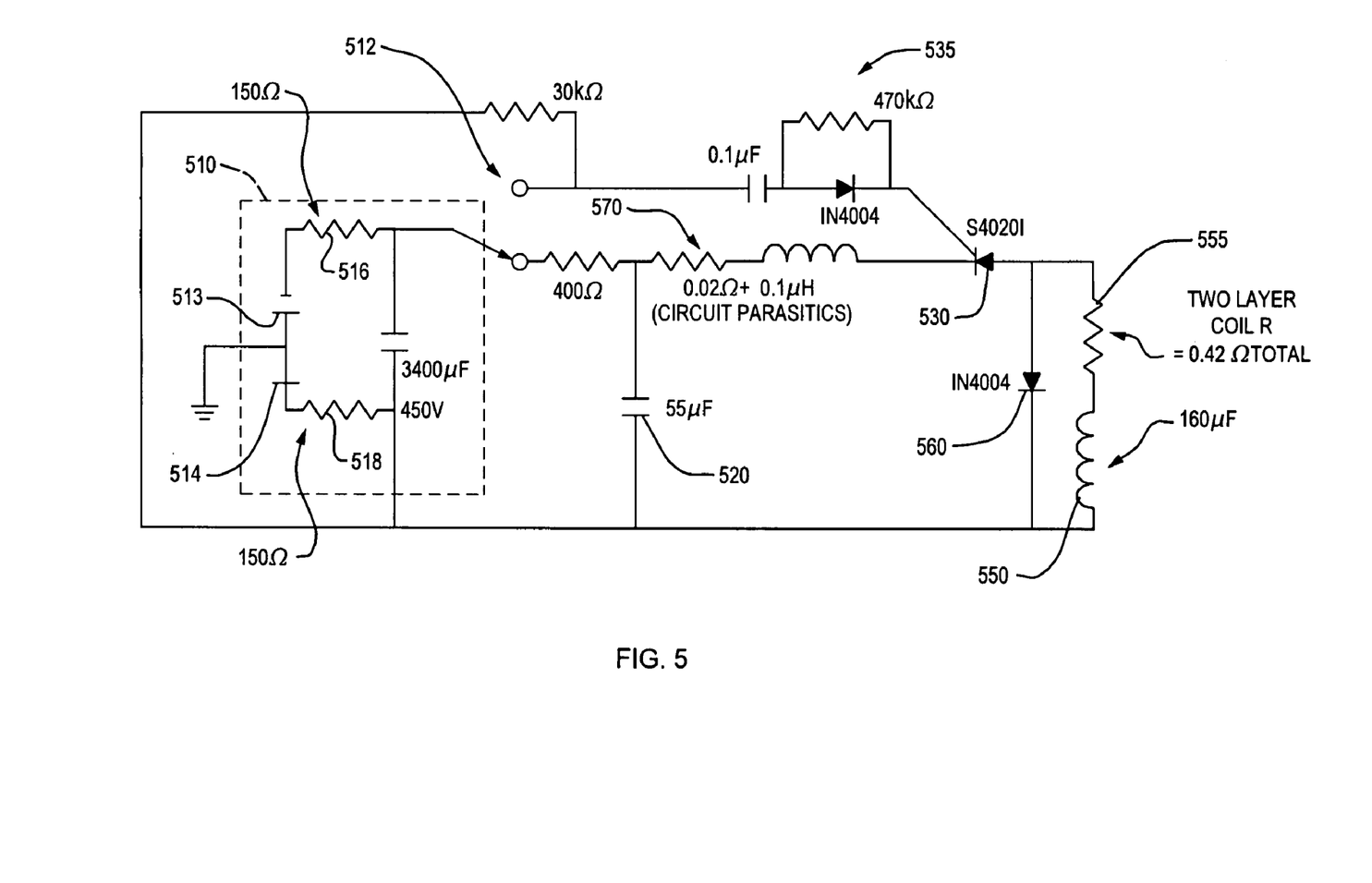
FIG. 5 is one embodiment of the sample SCR circuit for generating the current pulse in accordance with an illustrative embodiment of the present invention.

Once the disk is in place a large current pulse is driven to the coils. More specifically, as illustrated in FIG. 5, a circuit 500 is provided in accordance with the invention to produce the current pulse. A suitable power supply is illustrated in dashed box 510. The power supply is a split power supply that includes battery 513 and 514, with each respective battery having a load resistor 516, 518, for safety and protection. The invention is readily adaptable for use with other suitable power supply arrangements. Thus, the arrangement illustrated in FIG. 5 is for illustrative purposes only and is not limiting to the scope of the present invention.

Illustratively, power supply 510 generates 450 Volts (V). Using the switch 512, the power supply charges the capacitor 520. The current through the SCR 530 is zero when it is not conducting, and it acts as an open switch. When it is desired to provide a current pulse, the SCR 530 is triggered. More specifically, the switch 512 is adjusted to the position that allows current to flow through the path 535 to the SCR 530 to trigger the SCR to conduct, which in turn discharges the capacitor 520 into the coil pair (illustrated collectively as inductor 550) and to the series resistor 555 which represents the resistance of the coil pair. An optional free wheeling diode 560 absorbs the ringing current of the coils thus preventing SCR damage and maintaining the flow of stray current into the coil while resisting stray currents from flowing back in to the capacitor 520. Circuit parasitics are illustratively shown as the R-L pair 570.

It is preferred that the coils are connected in the circuit in parallel so that any geometric asymmetry is compensated for by the division of drive current between the coils in a way that minimizes the perpendicular excess field and thus the perpendicular field imposed on the disk. This automatic balance also minimizes mechanical forces which would have otherwise occurred due to eddy currents. Notably, during the current pulse, there is approximately 800 lb of repulsive force between the coils. Thus, a one percent imbalance, for example, would transfer an 8 lb impulse force to the disk. In addition, because the parallel coils are configured with opposite polarity, the inductance therein cancels, thus allowing less voltage and less insulation to be required for the given current amount driven to the coil pair.

Other arrangements can be provided for coils, such as a series connection, with corresponding changes in the circuit of FIG. 5 for providing a current pulse of sufficient magnitude to result in the 10 kOe needed to set the data layer. The series connection of the coils results in less current produced in the circuit, but requires a longer pulse and higher voltage needs. A ferromagnetic yoke outside of the coils can provide greater efficiency and less fringe field in the series arrangement, but would require fine (e.g., 5 mills) lamination using transformer steel or construction ferrite. Coil imbalances can also be addressed using one or more trim coils outside of the two main coils in which case a fraction of the pulse current is diverted to the trim coil to null imbalances. An optional fan may be added to either embodiment in order to thermally manage the system when it operates at higher disk pre-conditioning rates.

Figure 6:
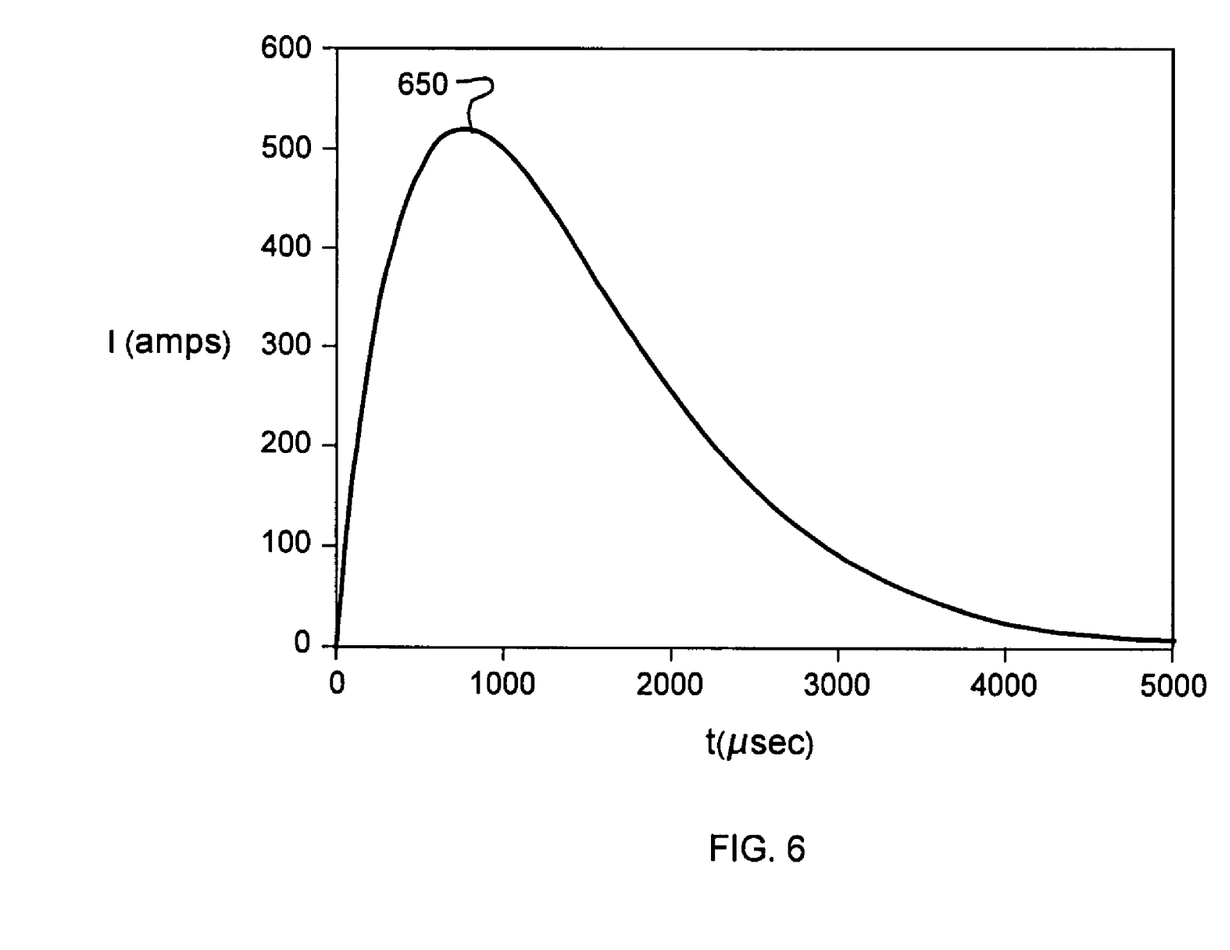
FIG. 6 is a plot of current in amperes versus time in microseconds for a current pulse generated by the circuit of FIG. 5.

An example of a current pulse driven to the coils in accordance with the invention is illustrated in FIG. 6. FIG. 6 is a plot of current in Amps on the ordinate versus time in microseconds on the abscissa. The pulse peak 650 was produced using series double coils and a 300 volt power supply with a total inductance of 163 micro-henries, a total resistance of 0.42 Ohms and a total capacitance of 3600 micro-farads. The 520 Amp pulse 650 was thus produced.

Figure 7A:
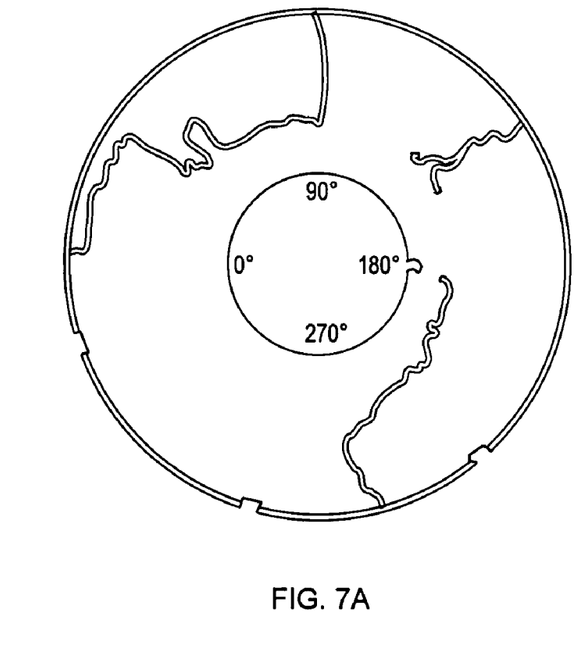
FIG. 7A is a magnetic image of a disk before preconditioning in accordance with the present invention.
Figure 7B:
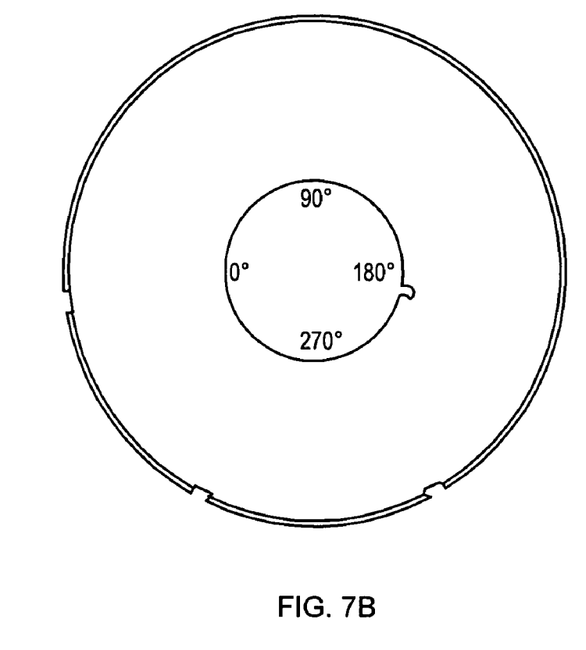
FIG. 7B is a magnetic image of the disk of FIG. 7A after preconditioning in accordance with the present invention.

FIG. 7A illustrates a magnetic image of a disk before preconditioning in accordance with the present invention. The disk has SUL domain walls present. FIG. 7B is a magnetic image of the same disk after preconditioning in accordance with the present invention. The domain walls are cleared from the magnetic layer and the SUL is set in a single domain state.

In accordance with a further aspect of the invention, the pair of pancake coils can be used to generate a large field for applications other than preconditioning a disk in the manner described. In yet a further embodiment, only one coil can be used to provide the field, if the disk is adequately supported against the repulsive force that occurs when the current pulse is driven in the coil. These and other embodiments and applications are within the scope of the present invention.

It should be understood that the invention provides an apparatus and method for simultaneously setting a data layer of a disk and for setting the magnetization in a hard biased SUL, while leaving the SUL in a domain wall free state. The invention does not require expensive permanent magnets, but still generates enough field to both set the data layer and the hard bias layer of the SUL.

While the invention has been particularly shown and described with reference to preferred embodiments thereof, it will be understood by those skilled in the art that various changes in form and details can be made without departing from the spirit and scope of the invention. Furthermore, the terms and expressions that have been employed herein are used as terms of descriptions and not of limitation. There is no intention in the use of such terms and expressions of excluding any equivalents of the features shown and described or portions thereof. It is recognized that various modifications are possible within the scope of the invention claimed.

What is claimed is:

1. An apparatus comprising:
   a pair of opposing pancake coils disposed generally parallel to one another with a gap defined therebetween, wherein said gap is configured to receive a magnetic storage disk for preconditioning;
   a support member to provide mechanical support for each respective pancake coil;
   an electrical circuit for generating and driving a current pulse into said pair of opposing pancake coils to induce a magnetic field substantially directed in a plane of said magnetic storage disk; and
   an assembly configured to automatically retrieve said magnetic storage disk and place said magnetic storage disk into said gap.

2. The apparatus as defined in claim 1 wherein said magnetic field is of a strength adequate to set a data layer of said magnetic storage disk to an equivalent of an AC demagnetization state.

3. The apparatus as defined in claim 2, wherein said magnetic field is of a strength of at least 9000 Oersteds.

4. The apparatus as defined in claim 1, wherein said magnetic field sets a hard bias layer of a soft underlayer of said magnetic storage disk so that said soft underlayer is radially biased and substantially domain wall free.

5. The apparatus as defined in claim 4 wherein said magnetic field also sets a data layer of said magnetic storage disk.

6. The apparatus of claim 1 wherein said electrical circuit includes a silicon controlled rectifier circuit and a capacitor that is operable to discharge to produce said current pulse.

7. The apparatus as defined in claim 6 wherein said electrical circuit further comprises a freewheeling diode operable to resist stray current from flowing back into said capacitor.

8. The apparatus of claim 1 wherein said support structure includes a generally round aluminum plate component comprised of raised spoke surfaces with apertures therebetween.

9. The apparatus of claim 1 wherein said pair of opposing pancake coils are electrically coupled in parallel.

10. The apparatus of claim 1 wherein said pair of opposing pancake coils are electrically coupled in series.

11. A method comprising:
    configuring a pair of opposing pancake coils disposed generally parallel to one another with a gap defined therebetween, wherein said gap is configured to receive a magnetic storage disk for preconditioning;
    driving a current pulse into said pancake coils to produce a magnetic field;
    supporting mechanically each respective pancake coil against repulsive forces occurring when said current is driven to said pancake coils; and
    automatically retrieving said magnetic storage disk and placing said magnetic storage disk into said gap.

12. The method as defined in claim 11 further comprising placing said magnetic storage disk in said gap and driving said current pulse of a magnitude such that a data layer of said disk is preset to an equivalent of an AC demagnetization state.

13. The method as defined in claim 11 further comprising placing said magnetic storage disk in said gap and driving said current pulse to said pair of opposing pancake coils of a magnitude wherein a hard bias layer of a soft underlayer is radially biased and rendered substantially domain wall free.

14. The method as defined in claim 11 further comprising placing said magnetic storage disk in said gap and driving said current pulse to said pair of opposing pancake coils of a magnitude such that both a data layer of said disk is preset to an equivalent of an AC demagnetization state and a hard bias layer of a soft underlayer is radially biased and rendered substantially domain wall free.

15. The apparatus as defined in claim 1 wherein said magnetic field produced by said pair of opposing pancake coils is radial in shape.

16. The apparatus as defined in claim 1 wherein said magnetic field produced by said pair of opposing pancake coils has an outer diameter larger than an outer diameter of said magnetic storage disk.

17. The method as defined in claim 11 wherein said magnetic field produced by said pair of opposing pancake coils has an outer diameter larger than an outer diameter of a magnetic storage disk.

18. The method as defined in claim 11 wherein a magnetic field produced by said pair of opposing pancake coils is radial in shape.

\* \* \* \* \*